July 23, 1929.  A. C. BROWN  1,721,586

FAUCET HANDLE

Filed Aug. 4, 1928

Inventor.
Albert C. Brown

John C. Carpenter
Atty.

Patented July 23, 1929.

1,721,586

UNITED STATES PATENT OFFICE.

ALBERT C. BROWN, OF CHICAGO, ILLINOIS.

FAUCET HANDLE.

Application filed August 4, 1928. Serial No. 297,515.

The object of this invention is to provide an improved faucet handle for use in such installations in which it is desirable to employ a number of faucets for controlling the discharge of liquids of different character, for example, as in lavatories which are provided usually with hot and cold water faucets.

Numerous other objects and advantages of the invention will be apparent as it is better understood from the following description, which, taken in connection with the accompanying drawings, discloses a preferred embodiment thereof.

Figure 1:
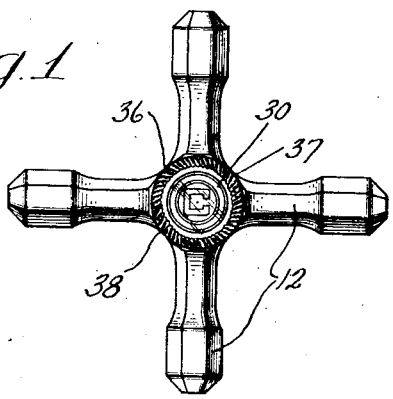
Figure 1 is a plan view of a faucet handle constructed in accordance with the invention.
Figure 2:
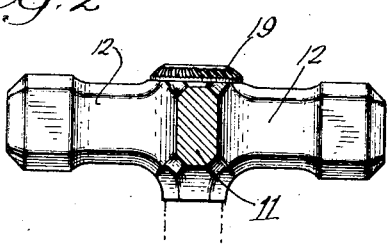
Fig. 2 is a side sectional elevation of the same.
Figure 3:
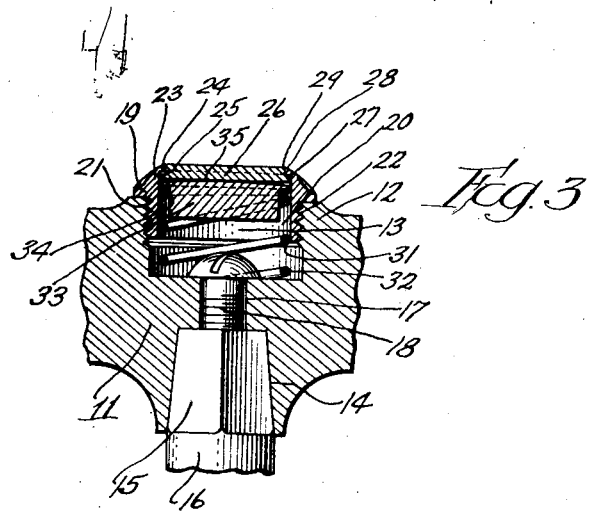
Fig. 3 is a detailed, sectional elevation of the device for adjusting the indicator disc which identifies the liquid controlled by the faucet.

The illustrative faucet handle is one especially adapted for use on the valve stem of a lavatory valve for controlling the discharge of water into the lavatory basin. However, the invention is not limited to this type of faucet handle, for the reason that the improved indicator provided by the invention, as will hereinafter appear, may be employed with various types of faucet handles in which it is desired for identification purposes to provide an indicator for informing the user of the character of liquid controlled by the faucet handle. In the form shown in the drawings, the faucet handle, comprises, a central body 11 from which projects the radial arms 12, in the present instance four in number, and of the ornamental and decorative character shown. These arms 12 provide finger holds by which the faucet handle may be grasped and turned to operate the faucet which it controls.

The central body 11 is provided with a socket 13 which extends to the top of the body and is made preferably concentric with the axis of rotation of the faucet handle. The bottom socket 14 provided preferably with polygonal walls, as shown, extends from the bottom of the body 11, also concentric with said axis of rotation. This bottom socket 14 is adapted to receive a correspondingly shaped head 15 on the upper end of the valve stem 16 of the faucet on which the faucet handle is mounted. If desired, the socket 13 may be connected with socket 14 by a short bore 17 through which is inserted a screw 18 from the top of the upper socket 13. This screw 18 has its head resting on the bottom of the socket 13 and its shank extending through the bore 17 and may be screwed into a threaded socket provided in the head of the valve stem 16, for the purpose of retaining the faucet handle on the valve stem.

The top of the upper socket 13 is closed by a cap assembly, or head, comprising a ring member 19 provided with a depending cylindrical apron 20 having its exterior surface screw-threaded at 21 to engage corresponding screw threads 22 provided in the upper part of the cylindrical side wall of the top socket 13. The ring portion 23 of the ring member 19 rests on the top of the central body 11 of the faucet handle, when said member is screwed into place, and is provided with an interior flange 24 surrounding the central opening of the ring portion 23 and providing an annular shoulder 25. An indicator disc 26 is positioned in the central bore of the ring member 19 and is provided with a projecting annular flange 27 providing an annular shoulder 28 adapted to engage the shoulder 25 of the ring member flange 24. The cut-away edge of the disc 26 above its flange 27 provides an annular recess or groove 29 which receives the flange 24 of the ring member. This construction limits the upward movement of the indicator disc 26 in respect of the ring member 19 and retains the top face 30 of said disc substantially flush with the top of the ring member 19.

The indicator disc 30, as shown in Fig. 1, is provided with a symbol, or other indicating means, for identifying the liquid controlled by the faucet handle. In the present instance, the disc is shown as being provided with the letter "C" indicating that the faucet handle is to be applied to a cold water faucet. Obviously, however, the disc may be provided with any other indicating means for identifying other liquids, as for example, with the letter "H" adapting the faucet handle for a hot water faucet. The disc 26 is readily removable from the ring 19 permitting the use of any number of differently lettered or otherwise identified discs with the same standard construction of faucet handle.

Positioned in the socket 13 below the disc 30 is a coil spring 31, the lower end 32 of which engages the bottom of the socket 13 and the upper end a follower 33. The follower 33 is provided with a surrounding flange 34 for receiving the upper end of the coil spring 32, and the spring is of a character to press the follower 34 into engagement with the bottom face of the indicator disc 26 to hold the latter in position normally with the top of the ring member 19. Preferably, the disc engaging upper face 35 of the follower 33 is formed of a surface which is not plane, but of a shape, such as spherical, to provide a single point of contact of the follower 33 with the disc 26. This construction reduces the friction between the follower and the indicator disc.

In a construction, such as hereinabove described, the indicator disc 26, while normally pressed by the follower and its spring 31 so that the upper face of the disc 30 is substantially flush with the top of the surrounding ring member 19, and the disc is held against accidental movement by the engagement of its flange 27 with the corresponding flange 24 of the ring member, yet the yielding character of the parts supporting the disc 26 and the reduction in frictional resistance permit ready turning of the disc relatively to the ring member. It often happens in the application of faucet handles to faucets that the indicator is not in visually correct position after the faucet handle has been tightened on the valve stem of the faucet, because of irregularities in the thread lengths of the companion parts. Nevertheless, it is desirable that the indicating means, such for example as the letter on the faucet handle, be in a visually correct position at the time when the faucet handle is in a position for keeping the faucet valve closed.

In the operation of the construction provided by the invention, after the faucet handle has been mounted on its companion valve stem, the indicator disc 26 may be readily turned relatively to the ring member 19 to adjust its position to visual accuracy by depressing the disc with the thumb and turning it until the proper adjustment is made. The improved spring and follower construction permit easy turning of the disc for all adjusting purposes, and yet apply sufficient supporting pressure to the disc to retain it in fixed position relatively to the ring member 19 in which it is mounted.

If desired, the top 36 of the ring member 19 may be beveled toward the outer periphery 37 of the ring member and formed with a knurled surface 38 which provides an adequate frictional contact surface for permitting the ring member to be unscrewed from the top of the faucet handle, whenever, for example, it is desired to replace the indicator disc 26 or to gain access to the interior of the socket 13. All the parts of the faucet handle are readily detachable, in fact, and yet capable of quick and secure assembly.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof. Moreover, it is not indispensable that all features of the invention be used conjointly, as they may be advantageously employed in various sub-combinations and other combinations.

I claim:

1. A faucet handle comprising a handle body having a bottom valve stem receiving socket, a top socket and a bore connecting said sockets whereby a retaining member may be inserted through said top socket and said bore into a valve stem mounted in said bottom socket, an indicator disc provided with a peripheral flange, a retaining ring member surrounding said indicator disc and provided with a flange companion to said disc flange for limiting relative upward movement of said disc, said retaining ring member being detachably mounted in said top socket, a follower formed with a curved top face providing a single point contact with the bottom face of said indicator disc, and a spring positioned within said socket between said follower and the bottom of the socket, for yieldably forcing said follower into engagement with said disc to maintain the latter normally at the limit of its upward movement relatively to said retaining ring member.

2. A faucet handle comprising a handle body having a bottom valve stem receiving socket, a top socket and a bore connecting said sockets whereby a retaining member may be inserted through said top socket and said bore into a valve stem mounted in said bottom socket, an indicator disc provided with a peripheral flange, a retaining ring member surrounding said indicator disc and provided with a flange companion to said disc flange for limiting relative upward movement of said disc, said retaining ring member being detachably mounted in said top socket, a follower formed with a top face shaped to provide a single point contact with the bottom face of said indicator disc, and a spring positioned within said socket between said follower and the bottom of the socket, for yieldably forcing said engagement with said disc to maintain the latter normally at the limit of its upward movement relatively to said retaining ring member.

3. A faucet handle comprising a handle body having a bottom valve stem receiving socket, a top socket and a bore connecting said sockets whereby a retaining member may be inserted through said top socket and said bore into a valve stem mounted in said bottom socket, an indicator disc provided with a peripheral flange, a retaining ring member surrounding said indicator disc and provided with a flange companion to said disc flange for limiting relative upward movement of said disc, said retaining ring member being detachably mounted in said top socket, a follower formed with a top face shaped to provide point contact with the bottom face of said indicator disc, and a spring positioned within said socket between said follower and the bottom of the socket, for yieldably forcing said engagement with said disc to maintain the latter normally at the limit of its upward movement relatively to said retaining ring member.

4. A faucet handle comprising a handle body provided with a socket, a retaining ring member mounted in said socket, an indicator disc mounted for rotary and downward movement within said retaining ring member, a follower formed with a curved top face providing a single point contact with the bottom face of said indicator disc, and a spring positioned within said socket between said follower and the bottom of the socket, for yieldably forcing said follower into engagement with said disc to maintain the latter normally at the limit of its upward movement relatively to said retaining member.

5. A faucet handle comprising a handle body provided with a socket, a retaining ring member mounted in said socket, an indicator disc mounted for rotary and downward movement within said retaining ring member, a follower formed with a top face shaped to provide a single point contact with the bottom face of said indicator disc, and a spring positioned within said socket between said follower and the bottom of the socket, for yieldably forcing said follower into engagement with said disc to maintain the latter normally at the limit of its upward movement relatively to said retaining member.

6. A faucet handle comprising a handle body provided with a socket, a retaining ring member mounted in said socket, an indicator disc mounted for rotary and downward movement within said retaining ring member, a follower formed with a top face shaped to provide point contact with the bottom face of said indicator disc, and a spring positioned within said socket between said follower and the bottom of the socket, for yieldably forcing said follower into engagement with said disc to maintain the latter normally at the limit of its upward movement relatively to said retaining member.

7. A faucet handle in which the handle body is provided with a socket, a rotatable indicator member movable into said socket, means for retaining said indicator member normally in position at the top of the socket, a follower below the indicator member providing a single point contact therewith, and a spring interposed between said follower and the bottom of the socket for causing the follower to force the indicator member normally into its position at the top of the socket.

8. A faucet handle in which the handle body is provided with a socket, a rotatable indicator member movable into said socket, means for retaining said indicator member normally in position at the top of the socket, a follower formed with a top face shaped to provide point contact with the bottom face of said indicator disc, and a spring interposed between said follower and the bottom of the socket for causing the follower to force the indicator member normally into its position at the top of the socket.

9. A faucet handle in which the handle body is provided with a socket, an indicator member mounted in said socket, means for retaining said indicator member normally in position at the top of the socket, a follower below the indicator member, and a spring interposed between said follower and the bottom of the socket for causing the follower to retain the indicator member normally in its position at the top of the socket.

10. A faucet handle in which the body is provided with a socket, an indicator disc mounted within said socket, a retaining ring member surrounding the indicator disc, yielding means mounted within the socket engaging the indicator member for retaining it normally in engagement with said retaining ring member, whereby said indicator member may be depressed toward said socket to disengage it from said retaining ring member and permit rotation of said indicator member to change its position relatively to the faucet handle body.

11. A faucet handle, comprising a handle body provided with a socket, a retaining ring member mounted in said socket, an indicator disc mounted within said retaining ring member, and means for retaining said indicator disc normally in position at the top of said retaining ring member.

12. A faucet handle, comprising a handle body provided with a socket, a retaining ring member mounted in said socket, an indicator disc mounted within said retaining ring member, a follower positioned within said retaining ring member and adapted to contact with the bottom face of said indicator disc, and a spring positioned within said socket between said follower and the bottom of the socket to maintain said indicator disc normally in position at the top of said retaining ring member.

ALBERT C. BROWN.